June 8, 1937.  E. G. BUDD  2,083,003
PNEUMATIC TIRE AND REENFORCING MATERIAL THEREFOR
Filed Jan. 25, 1934  2 Sheets-Sheet 1
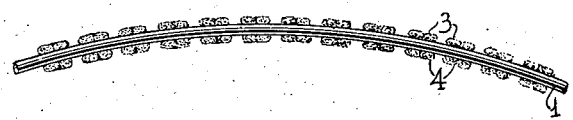
FIG. 5
FIG. 4.
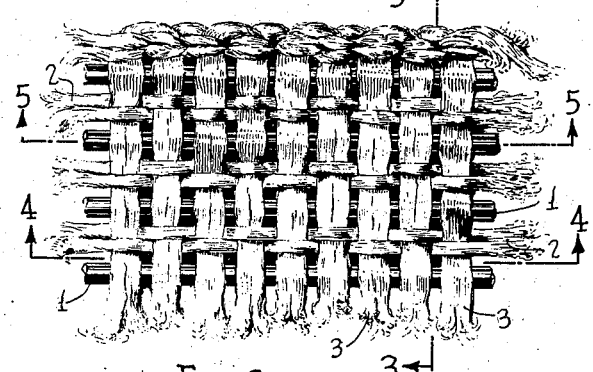
FIG. 2
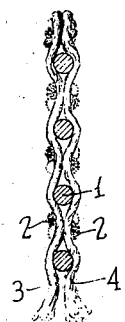
FIG. 3.
FIG. 1
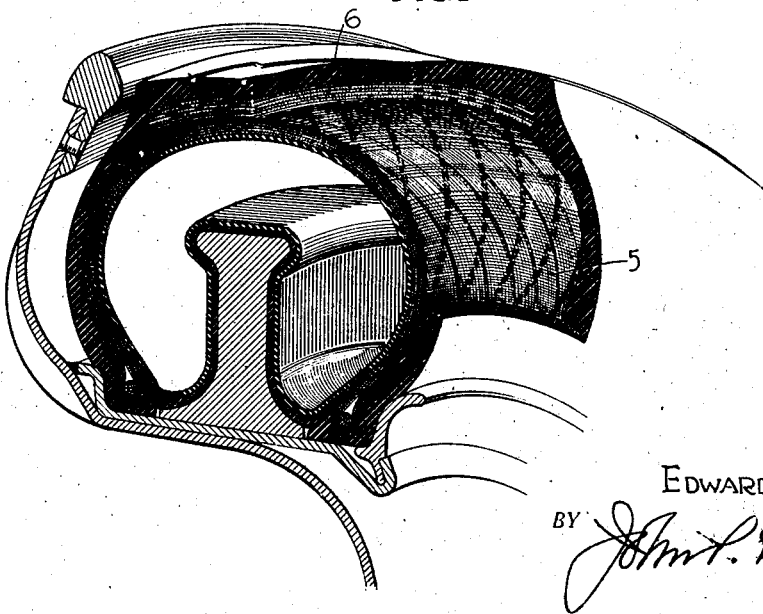
INVENTOR.
EDWARD G. BUDD.
BY
ATTORNEY.

June 8, 1937. E. G. BUDD 2,083,003
PNEUMATIC TIRE AND REENFORCING MATERIAL THEREFOR
Filed Jan. 25, 1934 2 Sheets-Sheet 2

INVENTOR.
EDWARD G. BUDD.
BY
ATTORNEY.

Patented June 8, 1937

2,083,003

UNITED STATES PATENT OFFICE 2,083,003

PNEUMATIC TIRE AND REENFORCING MATERIAL THEREFOR

Edward G. Budd, Philadelphia, Pa., assignor to Edward G. Budd Manufacturing Company, Philadelphia, Pa., a corporation of Pennsylvania Application January 25, 1934, Serial No. 708,175

4 Claims. (Cl. 152—13)

The present invention relates to pneumatic tires, and more particularly to a reenforcing material for pneumatic tire casings, and a reenforced tire casing constructed therewith.

A primary object of the invention is to provide an improved reenforcing web material of high tensile strength and substantially inextensible, but flexible and capable of repeated flexure without undue generation of heat, and capable of slight motion relative to the body material of the tire with a minimum amount of friction and consequent heat generation.

The ultimate object is to provide a tire casing constructed with such material, having improved durability and strength together with flexibility, and capable of withstanding high pressures and of operating under high loads and speeds with relatively low generation of heat. The invention while applicable to any form of tire is of special utility in wide flat tires, particularly those intended for use on rail cars where the inflation pressure and tire load is high and the area of contact between the tread and rails is small compared with the contact area of road tires, and where due to the combination of high speeds, and high load, the tendency to generate heat is increased.

Another object of the invention is to provide a tire with metallic reenforcement in the form of strands of high tensile metal arranged to reenforce the tire with their full tensile strength by taking the load always directly in the line of their extension, and at the same time capable of being flexed at high speeds without undue generation of heat or tendency to crystallize, and in which there is minimum friction from movement of the reenforcing strands relative to the body material of the tire.

A further object is the provision of a tire casing reenforcing material which will lend itself to incorporation in the tire with accuracy and a minimum amount of labor, and without special skill, or special machinery.

The above and other objects and advantages of the invention are attained by the provision of a novel reenforcing web material in the form of a ribbon or band fabricated of extremely flexible strands of high tensile metal, such as stainless steel, the metallic strands running longitudinally of the bands interspersed with longitudinal strands of organic fibre, preferably rayon or the like, and the whole bound together by a double set of weft strands of the organic fibre, the two sets of weft strands extending one over each side of the layer of metallic strands but woven as a single weft with relation to the longitudinal strands of organic material, leaving the metallic strands extending unbent from the direction of their extension so as to be able to take strains in that direction wholly in tension and without distortion from their normal shape and form, or undue movement in relation to the surrounding organic material.

In a preferred form bands of the reenforcing web are built into the tire both as part of the carcass and as a breaker strip, the reenforcing bands being incorporated in the carcass in the form of overlapping, diagonally crossing bands or strips of the reenforcing material, while in the breaker strip the bands of reenforcing material are laid circumferentially around the tire so that radial outward expansion of the tire will be resisted by the reenforcement substantially wholly in tension with the stress exerted directly in the line of extension of the metallic strands.

The above and other objects and advantages of the invention, and the manner of attaining the same will be more clearly understood upon reference to the following specification and the drawings accompanying the same.

In the drawings:

Fig. 1 is a prospective view in axial section partly broken away to show the construction of the carcass and the relative position of the breaker strip.

Fig. 2 is a greatly enlarged fragmentary plan view showing the construction of the reenforcing material.

Fig. 3 is a section on the line 3—3 of Fig. 2.

Fig. 4 is a section on the line 4—4 of Fig. 2.

Fig. 5 is a section on the line 5—5 of Fig. 2.

Figure 6:
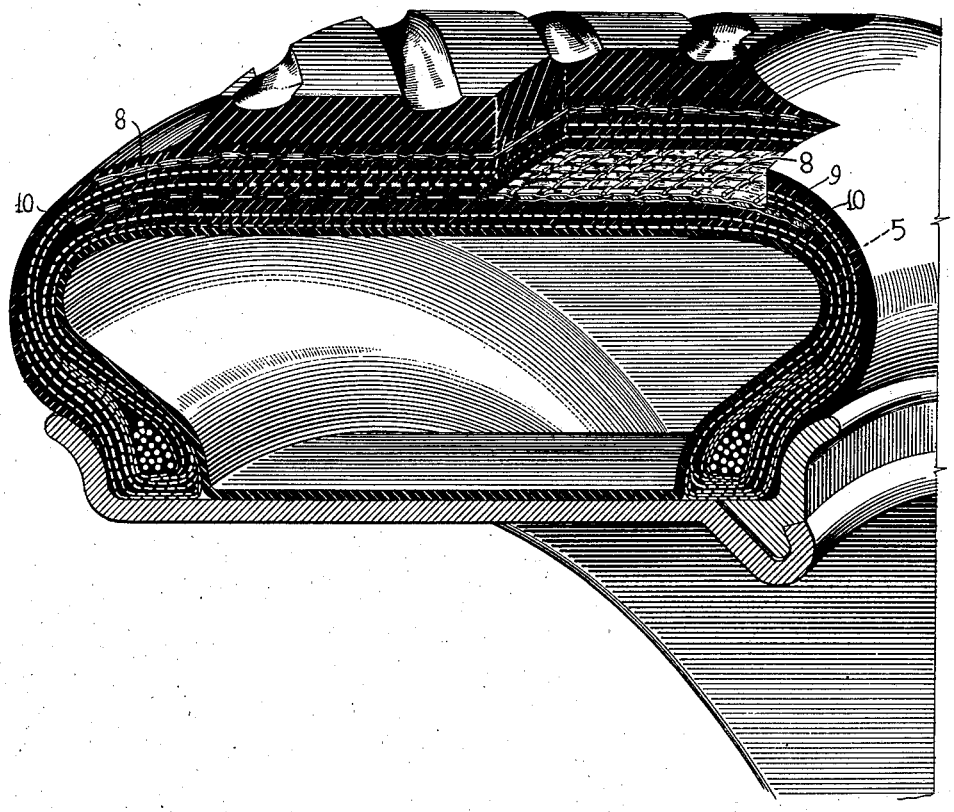
Fig. 6 is a prospective view in axial section partly broken away to show a modified form of reenforcing material and its position relative to the tire.

Referring to the drawings in detail, and first to that form of the invention shown as Figs. 1 to 3, the reenforcing web material consists of a strip of webbing comprising a layer of thin flexible filaments or strands 1, of high tensile metal such as steel or bronze, running longitudinally of the strip and interspersed with longitudinal strands 2 of organic material, preferably rayon, the whole being bound together as a woven tape or strip by a double set of weft strands 3 and 4 lying across the upper and lower sides respectively of the metallic strands 1, and interwoven with the longitudinal strands 2, leaving the metallic strands 1 to pass straight through the weave without warping or bending out of the line of their extension. This continuous extension of the metallic strands 1 is plainly shown in Figs. 2 and 5, while the interweaving of the double warp strands 3 and 4 as a single weft with the longitudinal warp strands 2, is clearly shown in Figs. 2, 3, and 4.

The metallic strands, in the present instance are in the form of fine wires of a diameter in the neighborhood of 1/64" and are capable of being flexed to a considerable degree and at a high rate of repeated flexure without strain and without excessive heat generation or a tendency to crystallization. The inter-weave between the longitudinal strands and weft strands of rayon holds the wires properly spaced from each other and substantially encased in a covering of rayon and isolated from each other thereby. The anti-friction qualities of the rayon also permit relative movement between the wires and the rayon covering with minimum friction and consequent minimum generation of heat. Because of the continuous direction of the metallic strands of the web, such metallic strands are enabled to take any longitudinal strain wholly in tension and without distortion of their normal shape as would be the case if the wires were bent out of the direction of their extension as in the usual warp strands of a woven fabric. Advantages of the use of rayon over other organic materials as the encasing material are its relatively great resistance to heat its anti-friction quality and strength, and its tendency to increase in strength when heated within certain limits.

The reenforcing material is primarily intended for use in the annular tread windings of rail cars to afford them the great strength required under the extremely high pressure necessary. However, the invention also contemplates the use of the reenforcing material throughout the entire carcass of the tire as well as for a breaker strip or tread winding.

In building up the carcass, the strips 5 of the reenforcing material are laid diagonally around the tire body in overlapping layers with strips of adjacent layers running at different angles so as to cross each other as indicated in Fig. 1 where the next to the outer layer is shown in dotted lines. For the breaker strip and tread reenforcement, strips 6 of the reenforcing material are wound circumferentially around the tread wall of the tire in several layers extending substantially the width of the tire tread. The reenforcing material may be vulcanized directly into the body material of the tire without intermediate treatment such as dipping; or may be first dipped in latex and calendered to give it a strong inter-filamentary bonding.

It will be clear that the crossed diagonal winding of the reenforcing material in the carcass of the tire affords strong reenforcement of the walls of the tire against expansion in all directions, while the reenforcing strips 6 which lie in the tread provide especially strong reenforcement of the tire against radial outward expansion taking the stress substantially entirely in tension and rendering the tread wall substantially inextensible circumferentially.

As the metallic strands or wires 2 of the reenforcing material used as the tread winding, extend circumferentially through the tire tread, any shock or bend of the tire tread in a plane normal to the axis of the wheel as when the tire passes over a raised object on the rail, such as a small stone, or small elevations in the road in the case of a road tire, will be resisted by the wire in tension. In both the carcass reenforcement and the tread reenforcement each of the metallic strands or wires 2, are encased in rayon which greatly reduces the friction and consequent development of heat due to relative motion between the strands of reenforcing material and the body material of the tire. Also the metallic strands, due to their relatively high heat conductivity aid in distributing throughout the tire any heat developed at the tread or other points, and thus prevent the accumulation of heat at such points.

Figure 7:
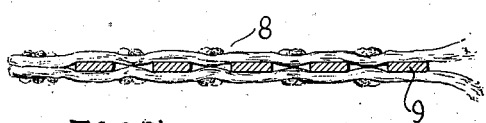
Fig. 7 is enlarged transverse section through the reenforcing strip of Fig. 6.

In the modification shown in Figs. 6 and 7, the re-enforcing webbing 8 is fabricated in the same manner as that shown in Figs. 1 to 5, and is similar in all respects to such formerly described webbing except that the metallic strands 9 are in the form of thin flat ribbons instead of round wires. While in Fig. 6 the strands 9 are shown with substantial thickness for the sake of clearness in illustration, it is to be understood that these strands are very thin and flexible for example in the neighborhood of 1/64" thick so as to permit repeated bending and flexing without undue generation of heat or tendency to crystallization. In the present instance the reenforcing material is shown applied in the form of a wide breaker strip for reenforcing the tread wall of a flat tread type of tire where strong reenforcement against radially outward expansion is necessary to maintain the desired contour of the tire and where considerable flexing and tendency to fatigue of material occur at the side portions where the tread wall joins the side walls of the tire. The reenforcing strips 8 are therefore extended across the width of the tire well into the curved portions 10 at the sides where the tread wall merges into the side wall of the tire.

While the layers of reenforcing material 8 are here shown each in the form of a single wide strip, it is to be understood that they may be applied in several strips laid side by side as in Fig. 1, although where used in the form shown in Figs. 1 and 2, and mainly as a breaker strip, the use of the material in a single wide band has the advantage of strengthening the tread wall against axial stress taking advantage of the reenforcing effect of the continuous weft strands.

Although in Fig. 2, but one selvage edge is shown, this figure being a greatly enlarged fragmentary view, it is to be understood that the bands of round or flat wire woven together by the rayon or other organic material are woven as bands of any desired width for use in the transverse direction, as for example, where the material is run diagonally as in the form of Fig. 1, the bands are relatively narrow as shown. For use in the tread as breaker strips the bands may be relatively narrow or on the other hand, they may be and preferably are of the full width of the tread. This is especially true of the wide breaker bands illustrated in the form of Fig. 6.

Very obviously the diameter or thickness of the wire is not a limitation of my invention. The diameter or thickness of the wire will obviously be increased with the increased load requirements of the tire and may in heavy duty tires be several multiples of one sixty-fourth of an inch.

Particularly do I desire to call attention to the great strength to be attained by the combination of the annular breaker bands with the diagonal bands as shown in Fig. 1. The coaction of the metallic elements extending transversely and at the same time circumferentially of the tire affords an unusually efficient combination extremely strong, highly resilient and greatly increases the life of the tire. Grouping in bands facilitates assembly and likewise enhances the longevity of the tire in that it admits of group action of the bands. The superiority of this form of wire reenforcement over the woven wire form in which the wires are kinked and offset from their line of extent for flexibility, and their ultimate strength greatly impaired by working the metal beyond the elastic limit, is most marked. The combined transverse metallic reenforcement and circumferential tread reenforcement in the form of the breaker strip is intended to be utilized in the flat tread form of tire shown in Fig. 6 as well as in the round form of tire shown in Fig. 1.

While I have thus shown and described certain specific embodiments of the invention, for the sake of disclosure it is to be understood that the invention is not limited to such specific embodiments, but contemplates all such variations and modifications thereof as fall fairly within the scope of the appended claims.

What I claim is:

1. A reenforcing webbing for pneumatic rubber tires comprising individual longitudinal flat strands of high tensile metal lying flat in the plane of the webbing, and bound together as individual strands by a weft of organic fiber of low friction characteristic in non-adhering relation to the metal strands.

2. A reenforcing webbing for pressure casings comprising longitudinal fibres comprised of high tensile wire, the major portion of the length of which is covered by transverse fibres of organic material in direct non-adhering contact therewith.

3. A reenforcing webbing for pressure casings comprising longitudinal fibres comprised of high tensile wire, the major portion of the length of which is covered by transverse fibres of organic material in direct non-adhering contact therewith, such transverse fibres being of rayon material.

4. A reenforcing webbing for pressure casings comprising longitudinal fibres comprised of high-tensile wire, the major portion of the length of which is covered by transverse strands of organic material in direct contact therewith, said transverse strands of organic material being relatively wide as compared with spaces between the strands and lying altogether on one face of the webbing, the strands on opposite faces being tied together between the longitudinal strands of wire.

EDWARD G. BUDD.